Feb. 15, 1938.   F. L. O. WADSWORTH   2,108,518
METHOD AND APPARATUS FOR SEVERING MOLTEN GLASS
Original Filed Aug. 28, 1933   2 Sheets-Sheet 1
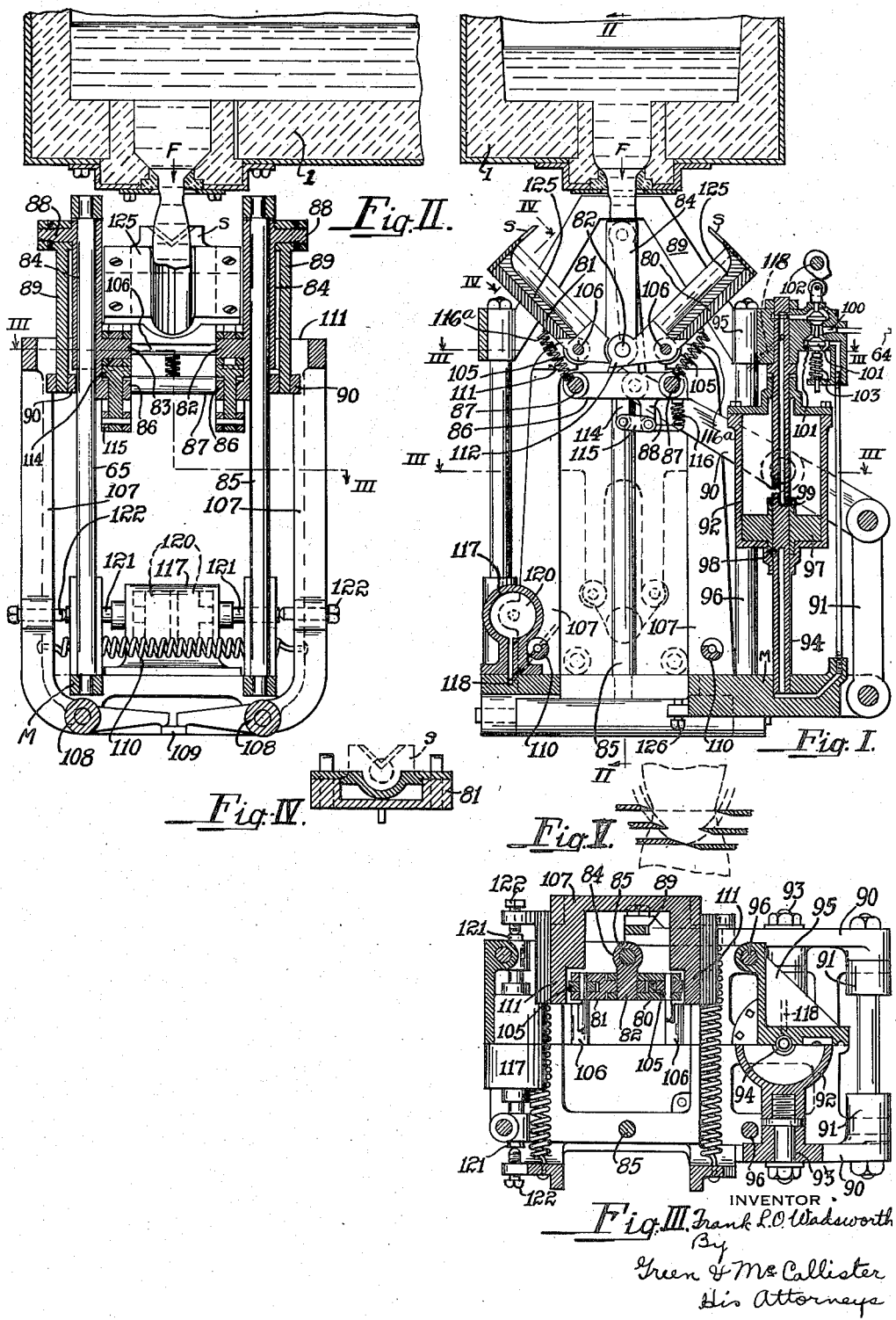
INVENTOR
Frank L. O. Wadsworth
By Green & McCallister
His Attorneys Feb. 15, 1938.   F. L. O. WADSWORTH   2,108,518
METHOD AND APPARATUS FOR SEVERING MOLTEN GLASS
Original Filed Aug. 28, 1933   2 Sheets-Sheet 2
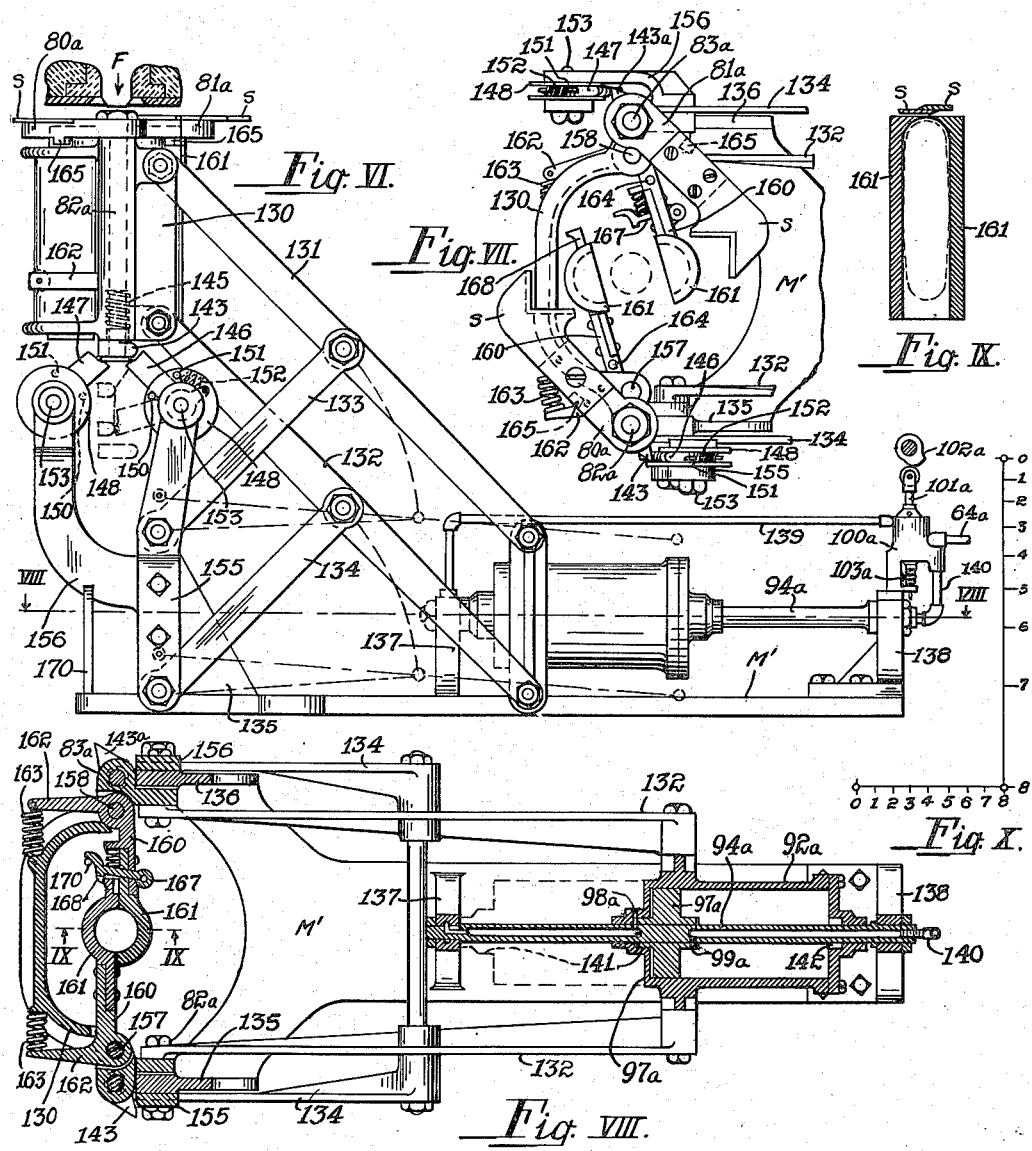
INVENTOR
Frank L. O. Wadsworth
By Green & McCallister
His Attorneys Patented Feb. 15, 1938

2,108,518

UNITED STATES PATENT OFFICE

2,108,518

METHOD AND APPARATUS FOR SEVERING MOLTEN GLASS

Frank L. O. Wadsworth, Pittsburgh, Pa., assignor to Ball Brothers Company, Muncie, Ind., a corporation of Indiana Original application August 28, 1933, Serial No. 687,043. Divided and this application June 16, 1934, Serial No. 730,935. Renewed January 7, 1937

21 Claims. (Cl. 49—55)

This invention relates to a method and apparatus for severing a continuously flowing stream of molten material into individual and successive mold charges and is a division of my copending application Serial No. 687,043, filed August 28, 1933.

One object of this invention is to provide mechanism for periodically severing a continuously flowing stream of material, composed of a series of regularly recurrent enlarged sections which are connected together by sections of reduced area or diameter, at such points of reduced diameter in such manner that the severing action will not retard or check the downward movement of the stream particles at the plane of severance, but on the contrary, will assist and may, if desired, be made to temporarily accelerate this movement in the line of flow.

Another object of this invention is to provide mechanism which will very substantially increase the speed with which the successively cut off masses or gobs of glass are carried away from the oncoming stream of continuously flowing molten material and are delivered to the molds or receptacles in which they are to be fabricated. The main purpose of this procedure being (a) to project each severed charge to the receiving receptacle at such a high velocity that it is not necessary to stop or arrest the movement of the mold table or carrier to receive the said charge; (b) to so increase the momentum of the plastic mass that it will completely fill the mold cavity into which it is thus projected; (c) to minimize the time during which the severed charge is exposed to surface cooling by air currents and radiation; and, (d) to further increase the speed of feeding and forming or fabricating operation as a whole.

These and other objects which will hereinafter be made apparent to those skilled in this particular art, are accomplished by means of the invention described in the following specification and illustrated in the accompanying drawings, wherein:

Figure I is a transverse vertical section of a shear mechanism embodying one exemplification of my invention;

Fig. II is a vertical section on line II—II of Figure I;

Fig. III is a composite horizontal section on the double plane III—III of Fig. I;

Fig. IV is a detail section on plane IV—IV of Fig. I;

Fig. V is a semi-diagrammatic view of the section of the shear blades in severing the continuously flowing stream of molten glass;

Fig. VI is a side elevation of a second illustrative embodiment of my present invention;

Fig. VII is a plan view of the construction shown in Fig. VI;

Fig. VIII is a horizontal section on the line VIII—VIII of Fig. VI;

Fig. IX is a detail vertical section on the plane IX—IX of Fig. VIII; and

Fig. X is a diagram showing the relative movement of certain of the parts.

In the drawings, I have illustrated two exemplary types or forms of improved high speed shear mechanism for severing a continuously flowing stream of molten glass which is issuing through the orifice F in the bottom of a suitable forehearth I without interrupting or checking the free downward movement of any of the stream particles at the place of severance and for projecting the cut off gobs at an accelerated velocity into the receiving receptacle without arresting movement of the latter. Preferably, the stream of glass is being expelled through the orifice F in a continuously flowing stream of regularly enlarged sections connected together by sections of reduced area. Such feeding action may be accomplished with any desired type of feeding mechanism such as the pressure vacuum air feeders or the reciprocating plunger feeders now in general use.

In the illustrative construction shown in Figs. I to V inclusive, the two shear blades S, S—which are of the usual "cat's eye" form—are detachably secured to the cross legs of a pair of inverted U-shaped arms, 80—81, which are pivotally connected, like the leaves of an ordinary hinge, by the pintle pins 82—83, that are secured to, or formed integral with, the tubular side sleeves 84—84, of a vertically movable cage, which slides up and down on the guide rods 85—85 of a stationary frame M. The side members 84—84 are provided at their lower ends with rectangular heads 86—86, which are rigidly cross connected by the bolts 87—87, that serve to hold the connected parts in proper assembled position, with the pintle elements 82—83 in axial alignment. The tubular sleeves 84—84 are also provided at their upper ends with a second pair of pintle pins 88—88, which are pivotally connected, by the links 89—89, with the inner ends of a pair of actuating levers 90—90, that are flexibly attached, at their outer extremities, to the frame M, by the shackle bars 91—91. The levers 90—90 are pivotally connected, at a common intermediate point in their length, to the sides of a cylinder 92, by the stud shaft bolts 93—93; and the cylinder 92 is mounted to reciprocate axially on a hollow piston rod 94, which is attached, at its lower end, to the base plate of the frame M, and is supported, at its upper extremity, on a heavy cross head 95, that is carried by two vertical posts 96—96. A piston 97 is secured to the central solid portion of the piston rod 94, and is provided on each side with a short cylindrical hub member which is adapted to enter a corresponding recess in the adjacent head of the cylinder 92 when the latter is at the limit of its up or down movement; and the rod 94 is provided with two port openings 98 and 99, which are positioned at the ends of these hub members and afford communication between the two ends of the cylinder 92 and the corresponding ends of a reversing valve chamber 100, whose central portion is connected to the high pressure supply line 64. The chamber 100 contains a double Janus faced poppet valve assembly 101, which is moved in one direction—(to open the upper end of the cylinder 92 to the atmosphere and put the lower end thereof in communication with the pressure conduit 64)—by the edge cam 102, and which is moved in the opposite direction—(to exhaust air from the lower end of the cylinder 92, and admits pressure fluid to the upper end thereof)—by the compression spring 103.

The side legs of each U-shaped shear blade support (80 or 81), are provided with rollers 105, which are mounted on pivot pins 106—106 that may extend across the space between these legs (parallel with the connecting bolts 87—87), or may each terminate at the faces thereof; and a cooperative pair of cam dogs 107, 107, are pivotally mounted, (at 108—108) on the base of the frame M, and are normally held in the full line position of Figs. I, II, and III (against the stop block 109) by the tension springs 110—110. In this position the inwardly projecting upper ends 111, of the members 107—107, are positioned below and in the path of movement of the rollers 105—105 etc., and serve to move the shear blades to closed position (as shown in dotted lines in the lower portion of Fig. I) when the cage frame 84—86—87 etc., is moved downwardly by the piston-cylinder-lever and link-assembly 92—93—98—89 etc. Each of the side legs of the arms 81—82 is provided with a downwardly projecting tooth 112, that is adapted to engage with a double faced dog 114 which is slidably mounted in the head 86, and is normally held in engaging position, with the tooth elements 112—112 by the pivoted lever and spring elements 115 and 116 (see Fig. I). A cylinder 117 is mounted on the base plate of the main frame M, and is connected at its center, to the upper end of the hollow piston rod 94 (as indicated by the broken dotted line connections 118 of Figs. I and III); and this cylinder contains two oppositely moving pistons (120), which are attached to the piston rods 121, 121, that engage with adjustable screws 122, 122, in the arms of the frames 107—107. When compressed air is admitted to the upper end of the cylinder 92 (to raise and hold the shear cage in its upper position—as shown in the drawings), it is concurrently admitted to the cylinder 117 to move the piston and piston rods (120—121 etc.) outwardly, and rock the frames 107 away from each other, so as to carry the roller engaging dogs 111—111 out of the path of movement of the rollers 105, 105 etc.

The operation of this shear mechanism is as follows: At the proper interval in the cycle of feed action—preferably after the feeding mechanism has produced a natural "necking" of the outflowing stream—the cam 102 acts to depress the valve member 101, thus permitting the compressed fluid, in the cylinder 117 and in the upper part of the cylinder 92, to exhaust to the atmosphere, and concurrently establishing communication between the lower end of the cylinder 92 and the high pressure line 64 (as shown in Fig. I). The escape of the actuating fluid from the cylinder 117 permits the springs 110 to snap the cam elements 111—111—111—111 into operative position under the shear cage rollers 105—105—105—105; and this will occur before the cylinder 92 begins to move downwardly because the port openings 98 are, at first, partially throttled by the engagement of the hub on the lower face of the piston 97 with the cooperating recess in the lower head of the cylinder. The initial downward movement of the cylinder-link-and-cage assembly, 92—90—89—84—83 etc., engages the rollers 105 with the cam dogs 111 and closes the shear blades S—S to sever the flowing stream of glass by a combined and concurrent transverse and axial movement;—the ratio between these two movements and the resultant angle of cut (see Fig. V) being determined and controlled by the contour of the roller engaging cam terminals 111—111 etc.

Each of the shear frames 80 and 81 is also preferably provided with removable, semi-cylindrical stream engaging sleeves or guards 125—125 (see Figs. I and II) whose inner diameter is slightly larger than that of the corresponding section of the glass stream, and whose upper ends are positioned in close proximity to the lower faces of the shear blades S—S, and are so shaped as to conform closely to the severed end of the cut off "gob" or mold charge; and as soon as this has been completely separated from the superadjacent oncoming portion of the flowing stream, (by the meeting of the shear blade edges), the downward movement of the now closed shear-blade-guard-sleeve elements, is very rapidly accelerated (by the full opening of the cylinder port 98) and the severed gob is projected downward at a high velocity—which is very substantially greater than that imparted to it by gravity action alone—and is thus delivered to the receiving receptacle at such a speed that it can be transferred thereto without stopping the mold carrier, and with such an increased momentum that its impact with the bottom of the mold cavity will cause the soft hot plastic mass to completely fill the said cavity (to the required depth) even though the initial shape of the severed charge is quite different from that of this cavity.

The initial speed of downward movement of the closing shear blades S, S, is preferably so controlled—with respect to their concurrent transverse motion—that this movement is somewhat more rapid than the flow of the stream particles, under the expulsion forces then acting on the glass; so that the upper surfaces of the shear blades are never in contact with the previously cut portions of the stream, (see Fig. V), and can, therefore, never check, or chill these oncoming parts, or affect in any way the action of the feed mechanism in producing a continuous, uninterrupted discharge of molten material from the delivery orifice F. The degree of acceleration, and of increased speed of delivery, which is imparted to the cut off "gob", may be varied and controlled, within wide limits, by varying the pressure in the supply line 64—or by changing the cross sectional area of the cylinder 92; or by varying the length of travel of the shear carriage on the guides 85—85; or in various other ways which will be readily understood by engineers.

When the cylinder 92 approaches the lower limit of its downward travel the cylinder boss on the upper face of the piston 97 enters the recess in the top cylinder head, and throttles the escape of air from the port 99, thus trapping a certain quantity of air in the upper part of the downwardly moving cylinder, which will act as an elastic buffer or cushion to arrest the movement of the cylinder actuated parts and bring them to rest without detrimental shock or jar. At the termination of this movement the end of the lever 115 comes in contact with an adjustable screw 126, and moves the dog 114 out of engagement with the shear arm teeth 112—112 and permits the shear arms 80 and 81 to be thrown apart to their open position by suitable springs 116a. The continued rotation of the cam 102 then permits the reversing valve 101 to be lifted by the spring 103; and the concurrent admission of compressed fluid to the cylinder 117 and to the upper end of the cylinder 92, first opens the cam arms 107—107 (and moves the cam ends 111—111 out of the path of the rollers 105—105 etc.), and then lifts the shear cage to the top of the guides 85;—the end of this lifting movement being gradually cushioned and checked, as before, by the throttling of the lower piston rod port 98 and the resultant trapping of air in that end of the cylinder.

Each entire cycle of movement of the shear mechanism occupies only a small part of the intervals between successive severing operations; and the time during which the lower faces of the shear blades S—S, or the inner surfaces of the delivery-guard-elements 125—125 are in contact with the hot glass is so very short that these parts cannot become unduly heated—and it is desirable that they remain at the maximum working temperature of the receiving molds—and cannot, on the other hand, sensibly chill the outer surfaces of the delivered mold charges. In order to obtain the best results the removable guard delivery sleeves are changed when there is any substantial alteration in the shape or mass of the successively cut off section of the flowing stream; and their inner surfaces are preferably chromium plated and highly polished to prevent corrosion and transfer of heat either by direct conduction or by radiation. As already stated the shear blades S, S, are also removably mounted on the arms 81 and 82, so that they may be easily replaced when the edges become dulled, and are preferably made of a special alloy steel (such as "clearite"), which has been either heat treated, or "nitrided" to obtain the maximum resistance to wear. The engaging surfaces of these blades are, of course, ground to the arc of movement about the coaxial pintle pin supports 82—83; and the mounting is such that their engaged surfaces are maintained in spring contact with each other during their passage through the glass.

Figs. VI to X, inclusive, illustrate a second exemplary form of my improved severing and accelerated delivery mechanism which presents the same general features of functional action and operative performance as are characteristic of the construction last described. In this second embodiment of my invention the shear blades S, S, are detachably and adjustably mounted on arms 80a—81a, which are keyed to the upper ends of vertical shafts 82a—83a that are journalled in the ends of a flattened U-shaped yoke 130. This yoke is carried by a "straight line" linkage assembly, which comprises the two pair of rocker arms 131—131 and 132—132, that are pivotally attached, at their outer ends, to the said yoke frame, and at their inner ends to a horizontally reciprocable cylinder 92a; and a corresponding pair of radius arm guides, 133—133 and 134—134, that are pivotally connected at their opposite extremities to the central points of the arms 131 and 132, and to fixed brackets 135—136 on the supporting frame M' of the shear mechanism. The reciprocable cylinder 92a is slidably mounted on a tubular piston rod 94a, which is rigidly secured to the upright posts 137—138 on the frame M', and which carries a stationary piston member 97a; and the opposite ends of this hollow piston rod 94a are connected by the pipes 139 and 140, to the delivery ports of a reversing valve member 100a, whose inlet port is, in turn, connected to a high pressure fluid supply line 64a. The inner terminals of the passageways in the piston rod are provided with two radial ports 98a and 99a, which are positioned at the ends of the oppositely projecting hubs on the piston 97a; and the heads of the reciprocable cylinder 92a are provided with cylindrical recesses 141 and 142 that engage the said hubs at the ends of the reciprocatory movement and serve to partially throttle the port openings 98a and 99a.

The lower ends of the vertical shafts 82a and 83a are reduced in diameter and are keyed to triangular shaped cam teeth 143—143a; and the annular openings between these smaller sections of the shafts and the adjacent enlarged portions of their journal bearings are occupied by torsion springs, 145, whose terminals are respectively connected to the cam elements 143 and 143a; and to the yoke frame 130, and which serve to hold the connected shaft and shear arm members 82a—80a and 83a—81a, in the open (full line) position shown in Fig. VII. Each of these shaft cams 143 and 143a is adapted to be engaged by a rocker arm element, (146 or 147) which is mounted to move freely on the hub of a spool 148, but which is limited in its movement with respect thereto by the cross pins 150—151; and each of the arms (146 or 147) is normally held against the pin 150 by a spring 152. The spools 148—148 are rotatably mounted on stud bolts 153, 153, which pass through the forked or slotted ends of two upwardly extending brackets 155 and 156 that are bolted to the other side of the supports 135 and 136, and which also serve to hold the spool flanges and the forked arm terminals in an adjustable frictional engagement with each other.

The ends of the U-shaped yoke frame 130 are also bored to receive a second set of vertical shafts 157 and 158, that serve as pintle supports for two plates 160—160, to which are detachably secured a pair of recessed delivery cups 161—161. The inner surfaces of these members (161) are shaped to conform, or correspond, to the longitudinal contour and to the upper rounded or tapered end of the severed mold charge—which has previously been shaped to the desired form in the manner already explained—and the upper ends of the cups are positioned, as closely as possible, to the lower faces of the shear blades S, S (see Fig. IX). Each of the plates 160 is provided with a laterally extending arm 162, whose extremity is engaged by a suitable spring 163, that serves to normally hold the associated elements 160—161 in their open (full line) position of Fig. VII; and the upper edge of each plate is also provided with a stud pin 164 which is positioned in the path of movement of a downwardly projecting dog 165 on the adjacent shear blade arm 80a (or 81a). One of the members 160 carries a spring pressed latch 167, whose hooked end is adapted to engage with a radially extending lug 168 on the opposing delivery cup 161, and thereby lock the parts 168—161, 168—161, in the closed position shown in Fig. VIII.

This second form of severing and accelerated delivery mechanism—which may be substituted for the one previously described—operates as follows: When the desired mold charge has been formed, by the action of the feeder assembly, the cam 102a depresses the double poppet valve 101a, and thereby establishes communication between the compressed air line 64a and the rear end of the cylinder 92a, and concurrently opens the front end thereof to the atmosphere. The pressure exerted on the outer end of the cylinder moves the latter to the right—from the full line position of Fig. VII toward the position shown in Fig. VIII—and correspondingly rocks the "straight line" linkage elements, 131—132—133—134, on their fixed supports 135—136, to depress the shear-arm-yoke members (80a—81a—130 etc.). The initial downward movement of the last named parts brings the curved cam teeth 143—143a into engagement with the rounded and slightly recessed ends of the rocking cam arms 146 and 147; and as this downward motion continues, the coaction between these engaged cam elements, (142—146 and 143—147), rotates the shear arm trunnions 82a—83a (and the shear arms 80a—81a) in a clockwise direction, and causes the shear blade S, S, carried thereby to sever the downwardly flowing stream of glass by a combined and concurrent lateral and axial movement—(in the manner illustrated in Fig. V);—the relation between the two components of this movement being governed and regulated, as before, by the form and relative positioning of the actuating cam elements 143 to 147. As the shear arms 80a and 81a approach each other the lugs 165—165 thereon, engage the pins 164—164, and move the recessed delivery cups 161—161 to their closed position (see Fig. VIII);—the lugs and pins (165—164) being so adjusted that the shear blades S—S complete the severance of the glass stream and allow the cut off gob to drop below the end plane of the cup elements (161—161) before the latter are completely closed (see Fig. IX).

The further downward movement of the shear assembly carries the cam teeth 143—143a, below the range of action of the cam arms 146—147, and the shear arms 80a—81a are then opened by the action of the torsion springs 145; but the delivery cups (161—161) are held in their closed position by the spring pressed latch 167. In this first stage of action, the motion of the cylinder actuated parts is being constantly accelerated, by the progressive opening of the port 99a, and the resultant increase of effective pressure on the outer head of the cylinder 92a; and, in the subsequent stage of action, this initial acceleration is rapidly augmented, in part by the constant force exerted on the moving parts, and in part by the ever increasing ratio between the movement of the cylinder and the concurrent movement of the yoke 130 (see diagram of Fig. X). This imparts a corresponding acceleration to the severed mold charge, which is embraced by the delivery cups 161—161, and which is thereby projected downward at a velocity that is greatly in excess of that imparted to it by gravity action alone. As the yoke member 130 approaches the end of its downward movement (as shown by dotted lines in Fig. VI) the curved end of the latch 167 is engaged by the upper inclined terminal of a fixed rod 170, and is thereby moved out of locking contact with the lug 168; and the delivery cups 161—161 are then thrown apart by the springs 163—163, thus freeing them from any engagement with the mold charge and permitting the latter to continue its accelerated movement to the receiving mold or forming receptacle. At the same time the hub on the front side of the piston 97a begins to enter the recess 141 and to close the port 99a; thus trapping a substantial volume of air, between the piston and the adjacent advancing end of the cylinder 92a, and thereby cushioning and gradually arresting the movement of the cylinder and linkage assembly. If necessary this cushioning action—which is utilized to check the motion of the rapidly moving shear arm yoke without undue shock or jar—may be supplemented by the use of suitable buffer springs that are placed between the main bed frame M' and the radius guide arms 134—134 (or between the frame and the lower ends of the yoke 130); but if the depth of the recess 141 is properly proportioned to the total length of cylinder movement, these auxiliary spring checks will not be required and they are not therefore specifically illustrated in the drawings.

When the delivery movement has been completed the valve cam 102a releases the valve 101a and permits it to be moved to its initial position by the spring 103a. This opens the right hand (outer) end of the cylinder to the atmosphere, and admits compressed air to the opposite (inner) end (through the port 98a); and the parts will then be moved and lifted to the initial full line position of Fig. VI. At the end of this upward movement the cam teeth 143—143a engage the lower faces of the depressed cam arms 146 and 147, and rock them backwardly, on the hubs of the frictionally retarded spools 148, until they, in turn, engage the cross pins 151—151; and the cam arm and supporting spool elements are then rotated as a unit, on the stud bolts 153, until the teeth 142—143 have passed above, and out of contact with the said arms. The cam elements 146—147 will then be snapped forward again, into contact with the pins 150—150, by the springs 152; while the spools 148—148 are held stationary by the frictional engagement of their ends with the forks of the bracket supports 155—156. All of the parts are thus restored to the initial full line positions of Figs. VI and VII, and are ready for the next severing and accelerated delivery operation.

The "straight line" linkage connection between the shear-blade-delivery-cup-support and the actuating cylinder (92a) is in some respects preferable to the corresponding lever-arm-link connection (88—90—91—93 etc.), shown in Figs. I-II and III, because the greater degree of acceleration that is obtained for the same increment of cylinder movement. With the mechanism last described it is possible to obtain, with a ten or twelve inch movement of the delivery cup elements, a final discharge velocity of from thirty-five to forty feet per second (or more if desired). In order to attain such a speed under the acceleration of gravity alone it would be necessary to have a free fall of approximately twenty to twenty-five feet; and under practical conditions of operation it is quite impossible to obtain such a great length of drop before delivering the mold charge to the forming machine. The use of my accelerated discharge, or accelerated delivery mechanism—is therefore of great advantage in permitting the receiving receptacles to be positioned in close proximity to the delivery orifice of the feeder—and thus minimizing the loss of time, and the resultant cooling, involved in delivering the successively severed mold charges to the forming machine—and in also permitting these mold charges to be projected into the receiving receptacles at such a high speed as to insure the complete filling of the mold cavities—by momentum effect—and to fill them so quickly as to avoid the necessity of stopping the movement of the mold carrier for that purpose.

I desire it to be understood that I have devised various shearing structures and shearing procedures for severing a continuously flowing stream of molten glass to produce mold charges and in which the shear blades move downwardly with the stream, and that such mechanisms and procedures form the subject matter of and are claimed in copending applications for patent, and distinguish structurally and functionally from the features herein claimed, and the novel subject matter disclosed but not claimed herein is claimed in application Serial No. 687,043, of which this application is a division.

What I claim as new and desire to secure by Letters Patent is:

1. A shear mechanism for severing individual mold charges from a stream of molten glass comprising, a pair of vertically reciprocable shear blades, means for reciprocating said blades, means projecting into the path of travel of said blades for engaging and moving said blades to a closed position at the beginning of movement thereof in one direction, latch means for locking said blades in closed position during the remainder of the movement thereof in such direction, means adapted to engage and release said latch means at the end of such movement, and means for moving said blade closing means to an inoperative position on movement of said blades in the opposite direction.

2. A shear mechanism for severing a stream of molten glass into individual mold charges comprising opposed vertically extending side rods, a vertically movable cage slidably mounted on said side rods, shear blades hinged to said cage for movement therewith, means for reciprocating said cage, and means for engaging and moving said blades into cutting engagement with each other, said last-mentioned means being adapted to operate at the beginning of the downward movement of said cage whereby the blades are in cutting engagement with each other during the major portion of the downward movement of such cage.

3. A shear mechanism for severing a stream of molten glass into individual mold charges comprising opposed vertically extending side rods, a reciprocable cage slidably mounted on said rods, shear blades pivoted to said cage for movement therewith, means for reciprocating said cage, means for engaging and moving said blades into cutting engagement as said cage is moved in one direction, means for locking said blades in cutting engagement, and means adapted to engage and release said blade locking means as said cage approaches the lower limit of its travel.

4. A shear mechanism for severing a suspended stream of molten glass into individual mold charges comprising a pair of opposed side rods, a cage reciprocably mounted on said rods, shear blades pivotally mounted on said cage for movement therewith, means for reciprocating said cage, means carried by said rods and projecting into the path of travel of said blades for engaging and closing said blades on the downward movement of said cage, means for locking said blades in closed position, means for engaging and releasing said blade-locking means as said cage approaches the end of its downward movement, and means for moving said blade-closing means out of the path of travel of said blades on the upward movement of said cage.

5. A shear mechanism for severing a suspended stream of molten glass into individual mold charges comprising a stationary frame, a cage reciprocably mounted on said frame, shear blades pivotally mounted on said cage for movement therewith, means for reciprocating said cage, means carried by said frame and projecting into the path of travel of said cage for engaging and moving said blades into closed position on the downward movement of said cage, and fluid actuated means for moving said blade-closing means out of the path of travel of said blades on the upward movement of said cage.

6. A shear mechanism for severing a stream of molten glass into individual mold charges comprising a stationary frame, a cage reciprocably mounted on said frame, shear blades pivotally mounted on said cage, fluid actuated means for reciprocating said cage, means for engaging and moving said blades to a closed position on the downward movement of said cage, means for holding the blades in such closed position during the continued downward movement of said cage, means for releasing said blade holding means at the end of the downward movement of said cage, and fluid actuated means for moving said blade closing means to an inoperative position on the upward movement of said cage.

7. A charge severing and delivering mechanism comprising a pair of opposed shear blades, a cup associated with each blade, a vertically reciprocable member on which said blades are mounted, means for reciprocating said member, cam means adapted to engage and move said blades and associated cups to a closed position at the beginning of the downward movement of said member, means for locking said cups in such closed position, and means for engaging and releasing said cup locking means at the end of the downward movement of said member.

8. A charge severing and delivering mechanism comprising a pair of opposed shear blades, a delivery cup associated with each blade, a vertically reciprocable member on which said blades and cups are mounted, means for reciprocating said member, cam elements adapted to engage and move said blades to a closed position at the beginning of the downward movement of said member, means carried by said blades and adapted to engage and close said delivery cups as said blades are moved to closed position, latch means for locking said delivery cups in closed position, means for releasing said latch means at the end of the downward movement of said member, and means for returning said delivery cups to their original position.

9. A charge severing and delivering mechanism comprising a pair of opposed shear blades, a rocker arm on each of said blades, a charge embracing cup associated with each of said blades, a vertically reciprocable member on which said blades are mounted, means for reciprocating said member, cams adapted to engage said rocker arms and move said blades to a closed position on the downward movement of said member, and means on said blades adapted to engage and move said charge embracing cups to a closed position.

10. A charge severing and delivering mechanism comprising a pair of opposed shear blades, a rocker arm on each of said blades, a charge embracing cup associated with each of said blades, a vertically reciprocable member on which said blades and cups are mounted, means for reciprocating said member, cams adapted to engage said rocker arms and move said blades to a closed position on the downward movement of said member, means on said blades adapted to engage and move said cups to a charge embracing position, means for locking said cups in charge embracing position, and means for releasing said locking means as said vertically reciprocable member approaches the end of its downward movement.

11. A charge severing and delivering mechanism comprising a pair of opposed shear blades, a rocker arm on each of said blades, a charge embracing cup associated with each of said blades, a vertically reciprocable member on which said blades and cups are mounted, means for reciprocating said member, yieldably mounted means adapted to engage said rocker arms and move said blades to a closed position on the downward movement of said member, means on said blades adapted to engage and move said cups to a charge embracing position as said blades are closed, means for locking said cups in charge embracing position, means for releasing said locking means as said member approaches the end of its downward movement, and means for opening said charge embracing cups.

12. A charge severing and delivering mechanism comprising a pair of opposed shear blades, a charge enveloping cup associated with each blade, a vertically reciprocable member on which said blades are mounted, means for reciprocating said member, cam elements adapted to engage and move said blades and associated cups to a closed position at the beginning of the downward movement of said member, means for locking said charge enveloping cups in closed position, means adapted to engage and release said locking means at the end of the downward movement of said member, and means for retracting said cups and holding them in their open position during the upward movement of said member.

13. Mechanism for severing a suspended stream of molten glass comprising a vertically reciprocable member, shear blades carried by said member, a fluid actuated motor, a straight line linkage mechanism connecting said member to said motor, means for delivering actuating fluid to said motor to reciprocate said member at high speed, and means adapted to engage and move said blades to cutting position at the beginning of the downward movement of said member, the continued downward movement of said member after the severance being utilized to impart an accelerating force to the severed charge.

14. A method of delivering mold charges to a moving receptacle which consists in establishing a flow of molten glass in the form of a suspended stream, severing a mold charge from said stream and delivering said severed charge to such receptacle at a speed in excess of the speed of its natural gravity fall and while continuing the movement of such receptacle.

15. A method of producing mold charges which consists in establishing a suspended stream of molten glass, periodically severing a mold charge from said stream, enclosing said severed charge and delivering said enclosed charge to a receiving mold at a greater speed than the speed of its natural gravity fall.

16. A method of delivering mold charges to a continuously moving receiving receptacle which consists in establishing a flow of molten glass in the form of a suspended stream, severing a mold charge from said stream and applying an impelling force to such severed charge of sufficient magnitude to impart thereto a speed sufficient to permit the delivery thereof to such receptacle while such receptacle is moving.

17. Mechanism for severing a suspended stream of molten glass comprising opposed shear blades, means for vertically reciprocating said blades, means responsive to the initiating of the downward movement of said blades for closing said blades, and means for holding said blades in closed position during the continued downward movement thereof.

18. Mechanism for severing a suspended stream of molten glass comprising opposed shear blades, means for vertically reciprocating said blades, means responsive to the initiating of the downward movement of said blades for moving said blades to a closed position, means for locking said blades in such closed position, and means for releasing said locking means to permit said blades to open as they approach the end of their travel.

19. Mechanism for severing a suspended stream of molten glass comprising opposed shear blades, means for vertically reciprocating said blades, means responsive to the initiating of the downward movement of said blades for moving the blades to closed position, means for holding said blades in such closed position during the remainder of the downward travel thereof, and means associated with said blades for enveloping the severed charge while said blades are in such closed position.

20. Mechanism for severing a suspended stream of molten glass comprising opposed shear blades, means for vertically reciprocating said blades, means responsive to the initiating of movement of said blades in one direction for closing said blades, means for holding said blades in closed position during the remainder of the travel thereof in such direction, means associated with said blades for enveloping the severed charge while said blades are closed, and means for releasing said blade holding means as said blades approach the end of their travel in such direction.

21. A method of producing mold charges and of delivering such charges to the successive molds of a continuously moving mold table which consists in establishing a suspended stream of molten glass above such mold table, moving opposed shear blades in the direction of flow of said stream and toward said table, closing said blades during the initial movement thereof toward said table to sever a charge therefrom and then moving said blades rapidly toward said mold table to accelerate the speed of such severed charge sufficiently to permit its delivery to a receiving mold while such table is moving.

FRANK L. O. WADSWORTH.